United States Patent [19]

Numrich et al.

[11] Patent Number: 5,726,245
[45] Date of Patent: Mar. 10, 1998

[54] COLOR-STABLE, WEATHER-, AND IMPACT-RESISTANT MOLDING COMPOSITIONS BASED ON POLYMETHYLMETHACRYLATE, AND PROCESS FOR PRODUCTION THEREOF

[75] Inventors: Uwe Numrich, Weiterstadt; Michael Wicker, Seeheim-Jugenheim; Thomas Rhein, Stadecken-Elsheim; Thomas Suefke, Erzhausen, all of Germany

[73] Assignee: Roehm GmbH Chemische Fabrik, Darmstadt, Germany

[21] Appl. No.: 753,682

[22] Filed: Nov. 27, 1996

[30] Foreign Application Priority Data

Nov. 30, 1995 [DE] Germany ............... 195 44 563.5

[51] Int. Cl.⁶ .................. C08F 6/14; C08L 55/02; C08L 33/04; C08L 51/04
[52] U.S. Cl. ................. 525/85; 525/82; 525/228; 525/255; 525/932
[58] Field of Search ............... 525/85, 82, 932, 525/228, 255

[56] References Cited

U.S. PATENT DOCUMENTS

| 4,602,083 | 7/1986 | Hung et al. | 528/488 |
| 5,063,259 | 11/1991 | Wanat et al. | 523/201 |
| 5,237,004 | 8/1993 | Wu et al. | 525/85 |
| 5,346,954 | 9/1994 | Wu et al. | 525/85 |

*Primary Examiner*—Irina S. Zemel
*Attorney, Agent, or Firm*—Oblon, Spivak, McClelland, Maier & Neustadt, P.C.

[57] ABSTRACT

Highly transparent, impact-resistant molding compositions based on polymethyl methacrylate (PMMA), having excellent color stability both during processing at high temperatures, as well as when under thermal stress, as a result of multiple processing with simultaneously high weathering stability and stability of the optical characteristics with the effect of water. Preparation is carried out according to a multi-step extruder process, wherein an extruder for the melt coagulation and one for the compounding are connected in series. Addition of small quantities of reducing inorganic phosphorous compounds at a later stage provides prolonged effectiveness.

20 Claims, No Drawings

COLOR-STABLE, WEATHER-, AND IMPACT-RESISTANT MOLDING COMPOSITIONS BASED ON POLYMETHYLMETHACRYLATE, AND PROCESS FOR PRODUCTION THEREOF

FIELD OF THE INVENTION

The present invention relates to highly transparent, impact-resistant molding compositions based on polymethyl methacrylate (PMMA), which are color stable under thermal stress, and also resistant to water and weathering. The invention also relates to a multi-step extrusion method for preparing such molding compositions.

DISCUSSION OF THE BACKGROUND

Molded articles made of PMMA have excellent transparency and good weathering resistance. However, PMMA molded articles are generally rather brittle.

Numerous impact-resistant modifications have been introduced to avoid this problem. One such modification is to embed an elastomeric phase into the PMMA matrix in disperse form. If possible, the elastomeric phase should have the same refractive index as the matrix and should not allow the phase boundary to be visible, in order to attain a transparency comparable with PMMA. The most advantageous method in the prior art for the production of transparent, impact-resistant molding compositions involves combining the PMMA matrix with a latex dispersion having a core/shell structure. The dispersion particles consist of a hard, crosslinked core phase, on which a soft, crosslinked shell is grafted. In order to make these modifier particles compatible with the surrounding matrix, yet another shell is polymerized thereon. Such impact-resistant molding compositions are disclosed in U.S. Pat. No. 3,808,180 and U.S. Pat. No. 3,843,753. With suitable selection of components, these molding compositions can be transparent. U.S. Pat. No. 5,216,082 discloses specific particle size and polydispersity of the core/shell emulsion particles, providing molding compositions with low susceptibility to haze and discoloration on exposure to heat and moisture, and with reduced tendency to stress whitening under impact.

The previously outlined methods for the production of impact-resistant molding compositions have one significant disadvantage. The dispersed elastomeric phase with core/shell structure, obtained by emulsion polymerization from an aqueous phase, contains a variety of polymerization auxiliaries, e.g., emulsifiers, radical initiators, and buffer salts. These cause yellowing in the finished molded article when subjected to thermal stress and reduce weathering resistance.

European Patent No. 465,049 A discloses adding reducing inorganic phosphorous compounds, to stop at least the yellowing effect of the undesirable residual byproducts. In European Patent No. 465,049A the addition of sodium hypophosphite in amounts of 50–1,000 ppm, based on the aqueous latex dispersion used, which is described here as an "emulsion", is disclosed. The reagent is specifically added to the emulsion before compounding with the matrix polymer. It thus develops its activity predominantly during the isolation of the polymer from the aqueous phase. Water contained in the emulsion is removed by drying, in particular by spray-drying, or by coagulation with salts, acids, or methanol, after the addition of the reducing inorganic phosphorous compound. No methods are disclosed for achieving the greatest possible quantitative removal of the aforementioned polymerization auxiliaries dissolved in the aqueous phase of the emulsion, i.e., the impurities. When the emulsion is spray-dried, the impurities remain in the polymer along with the added reagent.

The impurities entrained into the molding composition and the relatively high usage quantities of reducing inorganic phosphorous compounds introduce a disadvantage, according to investigations conducted by the applicant. Irreversibly hazy molded articles are obtained, in particular after a treatment with hot water. This is referred to as "water whitening" in the art. Thus, the products prepared according to European Patent No. 465,049 A are unsatisfactory with respect to maintaining their optical properties upon exposure to water.

European Patent No. 0,465,049 A stresses that it is detrimental to dehydrate the emulsion mixed with the reducing inorganic phosphorous compound, together with the matrix polymer in the extruder. This procedure is described as the melt coagulation method, for example, in U.S. Pat. No. 4,602,083. European Patent No. 465,049 A further discloses that this method limits the decolorization effect of a reducing inorganic phosphorous compound. The decolorization results obtained are inconsistent with the amount of reagent used. It is suspected that color and optical characteristics of the products obtained by the melt coagulation process are influenced by factors other than with the procedure of European Patent No. 465,049 A. Thus, there is considerable bias in using the reducing inorganic phosphorous compound as a decolorizing agent in the melt coagulation method. Consequently, addition of the reagent directly into the extruder is not disclosed, nor is addition of the reducing inorganic phosphorous compound at a time later than before the combination with the matrix.

Addition of non-oxidizing, non-nucleophilic alkaline-earth metal salts to a latex directly in the extruder is described in U.S. Pat. No. 5,063,259. Alkaline-earth metal hypophosphites are also disclosed. Addition of the salt is disclosed here for another purpose, i.e., exclusively for coagulation of the dispersion. The added quantities of salt for the coagulation are correspondingly high: 0.05–5%, based on the emulsion. Lower salt quantities, which are to be used exclusively for the decolorization, are not taken into consideration. Melt-blending with a matrix polymer supplied to the extruder is not disclosed. Thus, in comparison to the disclosure of European Patent No. 465,049 A, a different goal is attained by different means.

It is well-known to obtain a thermoplastic melt by coagulating and dehydrating a plastic latex in an extruder, then blending it, optionally simultaneously, with another thermoplastic.

German Patent No. 4,417,559.0 (Offenlegungsschrift) describes a method for the dehydration of two-phase mixtures of thermoplastic melts by means of a counter-rotating twin-screw extruder, which has an increased dehydration capacity. Water is removed in liquid form; removal of water via the vapor phase is extensively prevented. The former is preferable, since discharge of the water phase predominantly in liquid form provides simultaneous removal of the bulk of the polymerization auxiliaries dissolved therein, such as emulsifiers, initiators, and buffer salts, which have a negative influence on the optical quality in the finished molding composition and in the molded articles obtained therefrom.

SUMMARY OF THE INVENTION

Accordingly, an object of the invention is to provide impact-resistant, modified, highly transparent, and yellow tinge-free molding compositions with a particularly low tendency toward yellowing under thermal stress, and with improved weathering characteristics and improved stability of the optical characteristics on exposure to water.

Another object of the invention is to provide such molding compositions having optical characteristics approximating those of PMMA.

Yet another object of the invention is to provide a method for removing almost quantitatively the soluble impurities entrained by the water phase of the emulsion component, and to extend the duration of the effect of added decolorizing agents, such as reducing inorganic phosphorous compounds.

DETAILED DESCRIPTION OF THE PREFERRED EMBODIMENTS

These objects are achieved by a method for the production of a clear, impact-resistant modified molding composition FM with low tendency to yellowing, consisting of a matrix M and an elastomeric phase distributed in the matrix M, comprising a sequence of the following steps:

a) producing a latex emulsion DS in water with a core/shell structure by multi-step polymerization, wherein the core/shell structure comprises a hard, nonelastomeric polymer core with $T_g>70°$ C., an intermediate elastomeric layer with $T_g<25°$ C. comprising an acrylate polymer or copolymer, and at least one additional polymer layer with $T_g>70°$ C. comprising a methacrylate polymer or copolymer;

b) coagulating the emulsion DS in a first extruder by heating, shearing and adding 5-90 parts by weight of a matrix $M_1$ in the form of a melt, based on the solids content of the emulsion DS, to form a first melt mixture (DS+$M_1$) wherein $M_1$ is a fraction of a matrix M, and matrix M essentially comprises polymethyl methacrylate, wherein contained water is drawn off to leave a maximum of 10 wt % water in the first melt mixture, based on total solids;

c) compounding the first melt mixture (DS+$M_1$) in a second extruder by heating and shearing with the remaining quantity of the matrix $M_2$, such that $M_2$=M−$M_1$, wherein matrix $M_2$ makes up more than 90 parts by weight of the solids content of the emulsion DS, and wherein contained water is substantially completely drawn off, to form a second melt mixture (DS+$M_1$+$M_2$);

d) extruding, cooling, and isolating the second melt mixture (DS+$M_1$+$M_2$) as a clear, impact-resistant, modified molding composition having low yellowing tendency, wherein only during step c) or thereafter, one or more reducing inorganic phosphorous compounds are added to the melt mixture, wherein the reducing inorganic phosphorus compounds are selected from the group consisting of phosphinic acid, phosphonic acid, and the alkali metal, alkaline-earth metal, aluminum, and ammonium salts of phosphinic acid and phosphonic acid, wherein the ammonium ion of the ammonium salts can be substituted with up to four $C_1$–$C_4$-alkyl and/or $C_5$–$C_8$-cycloalkyl groups.

The features of the invention thus include the chemical structure of the polymer, the nature of the reducing inorganic phosphorous compounds, the special multi-step extrusion process, and particularly the means of addition, and the concentration of the reducing inorganic phosphorous compound.

Glass transition temperature ($T_g$) is described in Kirk-Othmer, Encyclopedia of Chemical Technology, 3rd Edition, Vol. 1, pp. 387–389.

Subject of the invention is an impact-resistant, modified, highly transparent PMMA molding composition. The general combination of components and structure of such compositions are known in the prior art. (See e.g., U.S. Pat. No. 3,793,402; U.S. Pat. No. 3,808,180; U.S. Pat. No. 5,216,082; and U.S. Pat. No. 5,270,397, the entire contents of which are incorporated by reference.) The preferred structure is that of a matrix, consisting essentially of polymethyl methacrylate, with a dispersed phase having a core/shell structure distributed therein.

The matrix polymer M comprises a hard phase with $T_g$ above 70° C., preferably above 100° C. It is made up of 80–100 wt % of a lower alkyl methacrylate, preferably methyl methacrylate, and 20–0 wt % of a lower alkyl acrylate, such as methyl acrylate, ethyl acrylate, 2-ethyl hexylacrylate, or butyl acrylate. The matrix polymer M makes up 30–95 wt %, preferably 40–90 wt %, more preferably 60–80 wt % of the molding composition FM.

The elastomeric modifier dispersed therein is present as a core/shell emulsion. It is present in the amount of 5–70 wt % in the molding composition, preferably 10–60 wt %, more preferably 20–40 wt %. The core/shell emulsion is produced by multi-step emulsion polymerization. The multi-step emulsion polymerization involves a successive metering of monomers, in chronologically separate steps, into the aqueous phase according to the known method of emulsion polymerization. The water content of the finished emulsion is generally 50–55 wt % and must later be removed for combination with the matrix polymer M.

For the first polymer stage, a hard core made up predominantly of lower alkyl methacrylates with $T_g>70°$ C. is produced. The second stage is an elastomeric stage consisting essentially of a acrylate polymer or copolymer, having $T_g<25°$ C. At least one other polymer stage has $T_g>70°$ C. and comprises methacrylate polymer or copolymer, preferably PMMA. By the chronological sequence of the polymerization steps, it is assumed that the polymers of the elastomeric stage and the final stage are arranged in a shell-like manner around the core. As shown in the art, both the core and the elastomeric stage are crosslinked. Based on the respective stage, 0.1–6 wt %, preferably 0.3–3 wt % comonomers with two or more double bonds are used.

The above-mentioned three stages are present in the following proportions:

5–40 wt % core stage
25–75 wt % elastomeric layer
20–60 wt % external layer.

It is also possible to prepare a core/shell structure with more than 3 polymerization steps (stages).

The molding composition FM can contain a number of additives, such as release agents, UV stabilizers, UV absorbers, antioxidants, thermal stabilizers, weathering stabilizers, and dyes and color pigments. Such additives are disclosed, for example, in European Patent No. 566,295 A, the entire contents of which are incorporated by reference.

The reducing inorganic phosphorous compounds AP contain phosphorous in the oxidation state of +1 or +3. Salts of the phosphinic acid (hypophosphites) and the phosphonic acid (secondary phosphites), and the free acids themselves, are readily available. The salts or the free acids may be present, e.g., in ortho or meta form, or as dimers.

Alkali metal, alkaline-earth metal, aluminum and ammonium salts can be used, wherein the ammonium ion can be substituted with up to four $C_1$–$C_4$-alkyl and/or $C_5$–$C_8$-cycloalkyl groups.

Organic reducing phosphorous compounds, selected from the aliphatic or monoarylaliphatic esters are far less effective. This is particularly true for various prior art antioxidants based on organic phosphites and hypophosphites.

Sodium hypophosphite is particularly effective and can be obtained at low cost. Its use is preferred in the present invention, although the prior art discourages the use of sodium hypophosphite due to its tendency to disproportionate under thermal stress.

Alkaline-earth hypophosphites are a more stable alternative, e.g., calcium hypophosphite. Calcium hypophosphite may also be used, however, particularly higher quantities of calcium hypophosphite can lead to haze in the molding composition or in molded articles produced therefrom.

Mixtures of various reducing inorganic phosphorous compounds can also be used. Very small concentrations of inorganic phosphorus compounds are sufficient in the present invention, which is unexpected in comparison to the state of the art with regard to the use of reducing inorganic phosphorous compounds. Thus, with less than 50 ppm, but with at least 10 ppm, based on the emulsion DS, excellent results are obtained. In comparison to the state of the art, in particular with European Patent No. 465,049 A, this is clearly a lower usage quantity. In European Patent No. 465,049 A, 50–1000 ppm reducing inorganic phosphorous compounds, based on the emulsion, are used. The datum of the usage concentration, based on the emulsion, is a calculated value and is selected for that reason in the invention under consideration, in order to make the advantage clear in comparison to the state of the art. In accordance with the invention, the reducing inorganic phosphorous compound is not added to the emulsion but rather to a melt mixture containing a part of the matrix.

If the reducing inorganic phosphorous compound is used in one of its hydrate forms, then the water of crystallization is deducted in the calculation of the usage quantity.

The optimum effect of the prevention of the yellowing, or the one regarding the ensuring of color stability, seen only from this perspective, is attained with usage quantities in the range of 10–300 ppm of the reducing inorganic phosphorous compounds AP, based on the molding composition FM. It is not published in the prior state of the art and it surprisingly became evident, however, that high usage quantities of reducing inorganic phosphorous compound lead to significant worsening of optical characteristics on exposure to water. Thus, usage quantities higher than 50 ppm, based on the emulsion, already produce undesirable results, such as strong irreversible haze in the polymer after wet storage ("water whitening") and a reduced resistance to weathering.

According to the prior art, this disadvantage must be accepted, since otherwise one would lose color stability. According to the prior art and European Patent No. 465,049 A, at least 50 ppm, preferably 100–200 ppm reducing inorganic phosphorous compounds, based on aqueous emulsion, are used in order to attain good color stability. In the present invention, good color stability is attained using significantly less than 50 ppm reducing inorganic phosphorous compounds, based on the emulsion. The present invention provides colorlessness and good stability of optical characteristics when subjected to water, mainly due to the specific processing conditions, especially the way of addition of the reducing phosphorous compounds.

Production of the emulsion DS takes place as mentioned above according to the prior art.

Coagulation of the modifier emulsion and its subsequent compounding is carried out in a two-stage extruder process, according to the invention. The disperse modifier phase, which is present as an aqueous emulsion, is coagulated in a first extruder in step b) with the addition of a part of the polymer matrix, according to the prior art melt coagulation method as disclosed in German Patent No. 4,417,559.0 (Offenlegungsschrift), the entire contents of which are incorporated by reference, and dehydrated to a large extent. A surprising advantage of this procedure is that by mixing the emulsion DS with a part of the matrix polymer $M_1$ with dehydration occurring simultaneously, gel formation tendencies are suppressed. The disperse modifier phase is mixed into the matrix in a particularly homogeneous manner, and the polymer melt obtained can therefore be particularly easily dehydrated. The water content of the polymer melt is below 10 wt % when leaving the first extruder. The quantity of worked-in matrix polymer is lower than the solids content of the emulsion DS. Generally, this quantity is 5–90 parts by weight, preferably 20–70 parts by weight, more preferably 40–60 parts by weight, based on 100 parts by weight solids content of the emulsion DS.

The polymer melt $(DS+M_1)$ obtained in step b) is combined with the remaining quantity of matrix polymer $M_2$ in a second extruder in step c) and compounded under degassing conditions. This second extruder can thus be described as a compounding extruder with a degassing function. The remaining water still present after step b) is almost completely removed in the degassing zones of the extruder. The matrix component $M_2$ comprises the main quantity of the matrix polymer. It makes up more than 90 parts by weight, based on 100 parts by weight solid content of the emulsion DS; in many cases, it is above 100 parts by weight. The matrix component $M_2$ is preferably introduced into the melt flow of the compounding extruder, as a granulate via a solids lateral metering or also in already melted form via another extruder. At this point, the reducing inorganic phosphorous compounds can also be introduced, together with $M_2$.

In step d), the degassed polymer melt $(DS+M_1+M_2)$ in which all components are combined is extruded, e.g., in the form of a strand, cooled, and cut.

A critical feature of the present invention is adding the reducing inorganic phosphorous compounds AP at a relatively late point in the processing. In this way, premature decomposition of the reagent can be avoided, and the complete reduction potential is available to prevent yellowing during compounding and further thermoplastic processing. This could serve to explain why the method in accordance with the invention is successful with such small quantities of reducing inorganic phosphorous compounds. The addition of the reagent takes place, in accordance with the invention in step c) at the earliest, at a time or place, where the water has been practically completely removed, or in any case, has declined below 1 wt %, based on the solids content of the melt. The addition is thus carried out preferably after degassing of the polymer melt. The thermal stress of the material after addition of the reagent, seen over time, is very slight.

Addition of the reducing inorganic phosphorous compounds can take place together with the main quantity of the matrix component $M_2$. To this end, they must be mixed beforehand. The mixing of the reducing inorganic phosphorous compound with the matrix polymer present as a granulate or as ground material usually takes place initially in a low-speed mixing apparatus, e.g., a drum, gyro wheel, or double-chamber plough-share mixer. The low-speed mixing apparatus achieve mixing without removing the phase boundaries (see Ullmann's Encyclopedia of Technical Chemistry, 4th Edition, Vol. 2, pp. 282–311, Verlag Chemie, Weinheim, N.Y., 1980).

The reducing inorganic phosphorous compounds can also be supplied to the melt independently of the main component of the matrix polymer, in the form of a masterbatch. To this end, they are compounded with a small quantity of the matrix polymer present in particle form and continuously introduced into the second extruder. Advantageously, a blueing agent is also mixed into the masterbatch simultaneously. Generally, such a blueing agent is a combination of blue and violet dyes or color pigments.

Although not essential, it is preferable to provide the molding compositions with blueing agents. Very small quantities are sufficient. The reason is the yellowness index of the molding composition, which is very low initially and for which optical compensation is simple. No more than 30 ppm, preferably less than 20 ppm blueing agents, based on the molding composition FM, are necessary.

The inorganic, reducing phosphorous compounds AP according to the invention can be applied in solid form as a powder, independent of whether they are mixed into the total quantity of the matrix polymer $M_2$ or into a masterbatch. Generally, the reducing phosphorus compounds AP are applied in solution. Water is preferred as a solvent. Preferably, the reducing phosphorous compounds are used in as concentrated, a solution as possible, preferably 30–60 wt %, more preferably 45–55 wt %. Generally, a concentration of approximately 50 wt % is suitable. It is surprising that even such a low quantity of reducing agent, as is represented by a concentrated solution of the phosphorous compound in the ppm range, can be distributed homogeneously, apparently over the entire polymer batch. In the case of salt mixtures consisting of reducing inorganic phosphorous compounds, it is, in principle, possible to add the components of the mixture to the polymer one after the other. Generally, a mixture or solution of the components is first produced, however, and this is added to the polymer in one step.

Following a basic principle of the present invention, namely the selection of as late as possible a time for the addition of the reagent, the addition can also take place after the compounding step in other embodiments. Possibilities in this regard are a mixing of the finished granulate or ground material with an aqueous solution of the reagent or, from case to case, also in solid form, a mixing of the granulate with a masterbatch containing the reagent.

According to the present invention, the reducing inorganic phosphorous compounds are blended in or introduced by a single, simple processing step. The method requires a special extrusion unit, namely, a two-stage extrusion track with the possibility for melt coagulation, which is well-known and readily available to the skilled artisan. With regard to the quantity and the chemical nature of the reducing inorganic phosphorous compounds AP, the process is very low in cost: only a small amount of stabilizer is needed, which in the case of sodium hypophosphite, is particularly low in cost.

Supplying part of the matrix polymer during melt coagulation of the emulsion in the first extruder provides the advantage of very effective dehydration. In this way, also, the formation of gel particles is extensively prevented.

The performance advantages of the invention are critical. A molded article of the present invention, e.g., produced by injection molding from an impact-resistant molding composition of the invention, is practically colorless. The yellowness index ($Y_1$) of such a molded article is below 1.5, preferably below 1, measured according to DIN 6167 (D65/10) or according to ASTM D 1925, wherein the thickness of the specimen is 3 mm. Such a low yellowness index is attained without any addition of blueing agents. If blueing agents are added during compounding, a yellowness index below 0.5, preferably below 0.3, is attained. Instead of the yellowness index, the transmission of an injection-molded disk with the dimensions of 60×45×3 mm can also be used for the characterization of the optical characteristics. The transmission (measured according to DIN 5033 (D65/10)) of a disk produced according to the invention is close to the theoretical value of 92% transmission, i.e., 89–91.5%.

An important advantage of the method of the invention is the excellent color stability of the molding composition with multiple processing to form molded articles. A part of the material in accordance with the invention, for example, the runner material from the injection molding or the edge trim during the extrusion are usually returned and subjected to further shaping after grinding and regranulation. Nevertheless, its reincorporation is not important with regard to the yellowness index: the yellowness index of the molding compositions of the invention and the molded article resulting therefrom does not increase even with multiple processing. Good color stability with multiple processing is attained with reducing inorganic phosphorus compound content of below 50 but at least 10 ppm, based on the aqueous, impact modifier emulsion DS. The latter numerical values are based on the aqueous emulsion of the first step of production, in order to reveal the advantages of the method of the invention.

The molding compositions produced in accordance with the invention are characterized by high weathering resistance and stability of the optical quality under the effect of moisture. It is precisely these characteristics which differentiate the present invention from the prior art. It is critical that the content of reducing inorganic phosphorous compound be low, namely below 50 ppm, based on the emulsion. Therefore, such low contents are preferred, as this is required to provide the unique combination of characteristics of the present invention, i.e., high color stability with simultaneously good weathering resistance and stability of optical characteristics under the effect of moisture.

Weathering resistance was tested according to the Xeno test in line with ISO 4892-2. The radiation energy per unit area of a UV-part of the global radiation of a wavelength of 300–400 nm after 5,000 h was 810 MJ/m$^2$. The global radiation energy per unit area with a wavelength of 300–800 nm after 5,000 h was 7.13 GJ/m$^2$. The relative humidity was 65%. The test temperature was established at 35° C. It corresponds to a black-panel temperature of approximately 55° C. The sprinkling/dry cycle was 18/102 min.

The result was that the molding compositions in accordance with the invention or the specimens produced therefrom practically did not exhibit any increase in haze with a continuous test time. In any case, it is below 10%, based on the starting value, which is the range of measurement accuracy. The haze is determined as scattered light photometrically according to ASTM D 1003 and given as "% haze". The same is true for color stability, expressed as yellowness index. The yellowness index was practically unchanged after 5,000 h of weathering time. The yellowness index was in the range of measuring accuracy, or 0.3.

The "boiling test" is a severe test for the permanence of optical properties under the influence of water, wherein the degree of "water whitening" is determined. In this test, standardized test objects as used, e.g., to determine the yellowness index are inserted for 5 min in nearly boiling water at 99° C. After standing for 3 hours, the residual haze is determined photometrically as scattered light according to ASTM D 1003.

After the boiling test only a slight increase in haze (below 15%) was detectable on the specimens produced in accordance with the invention.

9

In summary, the six advantages mentioned above are:

1) lower yellowness index in combination of the product with blueing agents,
2) lower yellowness index without blueing agents,
3) yellowness index stability with multiple processing,
4) low haze after carrying out the boiling test,
5) no increase in haze, and
6) no increase in yellowness index after carrying out the Xeno test for 5,000 h.

The molding compositions of the present invention generally possess these advantages in combination. Preferably, the molding compositions have at least 3, more preferably 4, even more preferably 5, most preferably all 6 of the above-mentioned advantages in combination.

The molding compositions FM of the present invention are processed to form molded articles FK. The usual methods of the prior art, such as injection molding, extrusion, pressing, sintering, and also other shaping methods, are suitable for this purpose. The shaping of the molded articles does not have any limitations.

The molding compositions FM in accordance with the invention are used, in particular, in the production of optically demanding molded articles. High processing temperatures are needed, especially with particularly long flow paths and/or complicated molded article configurations. The molding compositions produced according to the method of the invention are stabilized with respect to yellowing already during production.

EXAMPLES

Comparative Example 1

This comparative example describes the production according to the melt coagulation method of German Patent Application No. 4,417,559.0 of an impact-resistant molding composition without the addition of reducing inorganic phosphorous compounds.

Chemical composition:

a) Polymethyl methacrylate matrix M, produced by continuous bulk polymerization.
Average molecular weight (weight average)=110,000. Copolymer consisting of 96 wt % methyl methacrylate and 4 wt % methyl acrylate.

b) Latex emulsion as the impact modifier phase. Emulsion polymer synthesized in 3 steps in the following amounts:
1st step—Copolymer of methyl methacrylate/ethyl acrylate/allyl methacrylate (95.7/4.0/0.3).
2nd step—Copolymer of butyl acrylate/styrene/allyl methacrylate (82/17/1).
3rd step—Copolymer of methyl methacrylate/ethyl acrylate (96/4).

The mass ratio of the three steps is 20:45:35. The emulsion has a solids content of 45%.

The production of the molding composition is carried out already in 2 successive extruders in accordance with the invention, wherein in the first extruder, the emulsion is dehydrated and is combined with a partial quantity of the matrix polymer $M_1$, which is supplied as a melt. In the second extruder, which functions as a compounding and degassing extruder, the addition of the main quantity of the polymer matrix $M_2$ is carried out via lateral charging. At the end of the degassing zones, blueing agents are added via a masterbatch. The following are added, based on the molding composition:

10

Ultramarine Blue 31 (4 ppm)
Ultramarine Violet 11 (14 ppm).

The melt is then extruded to form strands, which are cooled, and cut. A pelletized molding composition is obtained, which is free of sodium hypophosphite.

The weight quantitative ratios $DS:M_1:M_2$ are 81.5:24.74:38.39. The emulsion contains 44.82 parts by weight water and 36.68 parts by weight solids.

Comparative Example 2

This comparative example corresponds to European Patent Application No. 465,049.

185 ppm sodium hypophosphite is added, based on the emulsion. The chemical composition otherwise corresponds to that in Comparative Example 1.

An emulsion DS is produced as in Comparative Example 1, mixed with 185 ppm sodium hypophosphite, and spray-dried. This composition is compounded in an extruder, together with the total quantity M of matrix polymers. A pelletized molding composition FM is obtained. It contains 150 ppm sodium hypophosphite.

Comparative Example 3

No sodium hypophosphite.

The production is carried out in accordance with Comparative Example 2, except that sodium hypophosphite is not added.

Example 4

Representative of the invention.

This example was carried out as in Comparative Example 1, except that 49 ppm sodium hypophosphite is added, based on the emulsion DS. The reagent is thereby metered into the compounding extruder in a masterbatch, together with the blueing agent, along with the main quantity of the polymer matrix, via a solids lateral charging.

The molding composition obtained contains 40 ppm sodium hypophosphite.

Example 5

Representative of the invention.

This example was carried out as in Example 4, except that instead of 49 ppm sodium hypophosphite, based on the emulsion, 123 ppm are used. The molding composition obtained has a sodium hypophosphite content of 100 ppm.

Example 6

Representative of the invention.

This example was carried out as in Example 4, except that instead of 49 ppm sodium hypophosphite, based on the emulsion, 245 ppm are used. The molding composition obtained has a sodium hypophosphite content of 200 ppm.

Example 7

Representative of the invention.

This example was carried out as in Example 4, except that 49 ppm calcium hypophosphite instead of 49 ppm sodium hypophosphite is used, based on the emulsion. The molding composition obtained has a calcium hypophosphite content of 40 ppm.

Yellowness Index

Round specimens with a diameter of 60 mm and a thickness of 6.4 mm were produced on a Battenfeld 350-CD screw injection molding machine at a cylinder temperature of 285° C. and a cycle time of 250 sec. The mold temperature was 64° C. Results are shown in Table 1 below.

TABLE 1

| Example No. | Content of Stabilizer | Yellowness Index | Light Transparency |
|---|---|---|---|
| 1 | 0 ppm sodium hypophosphite | 1.49 | 89.37% |
| 4 | 40 ppm sodium hypophosphite | 0.48 | 89.50% |

The molding composition of the present invention has significantly lower yellowness index.

Water Haze

Specimens with dimensions of 65×40×3 mm were produced by injection molding on a Battenfeld 350-CD screw injection molding machine at a cylinder temperature of 255° C. and a mold temperature of 50° C. The cycle time was 44 sec.

These specimens were stored for 5 min in a water bath of 99° C. in accordance with the "boiling test"; then allowed to stand for 3 h. Water whitening ("water haze") was determined as % haze according to ASTM D 1003. Results are shown in Table 2 below.

TABLE 2

| Example No. | Stabilization | % Haze |
|---|---|---|
| 1 | 0 ppm sodium hypophosphite | 7.9 |
| 7 | 40 ppm calcium hypophosphite | 10.9 |
| 4 | 40 ppm sodium hypophosphite | 12.5 |
| 5 | 100 ppm sodium hypophosphite | 15.5 |
| 6 | 200 ppm sodium hypophosphite | 17.8 |
| 2 | 150 ppm sodium hypophosphite | 46.4 |

With increasing content of sodium hypophosphite, % haze increases significantly. Water haze is particularly strong when the polymerization auxiliaries of the latex dispersion, such as emulsifiers, initiator radicals, and buffer salts are not removed, as in Comparative Example 2 (according to prior art, e.g. according to European Patent No. 465,049 A).

Xeno Test

Weathering resistance was tested according to the Xeno test (ISO 4892-2). The radiation energy per unit area of a UV-part of a global radiation of a wavelength of 300–400 nm after 5,000 h was 810 MJ/m$^2$. The global radiation energy per unit area with a wavelength of 300–800 nm after 5,000 h was 7.13 GJ/m$^2$. The relative humidity was 65%. The test temperature was established at 35° C. It corresponds to a black-panel standard temperature of approximately 55° C. The sprinkling/dry cycle was 18/102 min. Results are shown in Table 3 below.

TABLE 3

| Example | ppm Sodium Hypophosphite | Time in h | Light Transparency | Yellowness Index | % Haze |
|---|---|---|---|---|---|
| 3 | 0 | 0 | 90.7 | 1.6 | 2.0 |
|   |   | 1,000 | 90.1 | 1.5 | 2.9 |
|   |   | 2,500 | 90.3 | 1.9 | 3.4 |
|   |   | 5,000 | 90.1 | 2.3 | 2.9 |
| 2 | 150 | 0 | 90.6 | 0.7 | 1.8 |
|   |   | 1,000 | 86.9 | 2.9 | 10.4 |
|   |   | 2,500 | 83.5 | 5.2 | 8.0 |
|   |   | 5,000 | 85.7 | 4.2 | 4.9 |
| 1 | 0 | 0 | 91.1 | 0.26 | 1.8 |
|   |   | 1,000 | 90.5 | 0.20 | 1.7 |
|   |   | 2,500 | 88.0 | 0.20 | 1.8 |
|   |   | 5,000 | 89.0 | 0.20 | 1.8 |
| 4 | 40 | 0 | 91.4 | 0.16 | 1.8 |
|   |   | 1,000 | 90.8 | 0.13 | 1.9 |
|   |   | 2,500 | 89.3 | 0.08 | 1.7 |
|   |   | 5,000 | 89.9 | 0.18 | 1.8 |

The results of Example 4 in accordance with the invention are excellent with regard to yellowness index and % haze. Even after a weathering time of 5,000 h, the two characteristics have not worsened. This represents superior results over the prior art as represented by Comparative Examples 2 and 3. The relatively high sodium hypophosphite content of Example 2 also has a negative effect in comparison to Example 4: % haze and yellowness index have increased by a particularly large amount.

Optical Characteristics after Multiple Processing

The molding compositions obtained according to the various examples were subjected to 2 further compounding steps. The compounding temperature was 240° C. After the individual compounding steps, specimens in the dimensions of 65×40×3 mm were produced by injection molding on a Battenfeld 350-CD screw injection molding machine at a cylinder temperature of 255° C. and a mold temperature of 50° C. The cycle time was 44 sec.

It was thereby shown that the yellowness index rises without sodium hypophosphite during multiple processing. Calcium hypophosphite brings about a stronger haze than sodium hypophosphite. Already a small sodium hypophosphite concentration (40 ppm) ensures a color-constant blueing as a function of the number of compounding steps. With increasing sodium hypophosphite concentration, the result is undesirable transmission decline. Results are shown in Table 4 below.

TABLE 4

| | Properties after multiple processing (3 steps) | | | | | | | | |
|---|---|---|---|---|---|---|---|---|---|
| Ex. | | Transmission | | | Yellow Index | | | % Haze | | |
| No. | Stabilization | 1 | 2 | 3 | 1 | 2 | 3 | 1 | 2 | 3 |
| 1 | Not stabilized | 91.15 | 91.07 | 91.09 | 0.26 | 0.38 | 0.82 | 1.8 | 1.9 | 1.7 |
| 7 | 40 ppm Ca(H$_2$PO$_2$)$_2$ | 91.42 | 91.37 | 91.30 | 0.59 | 0.69 | 0.67 | 2.5 | 2.4 | 2.6 |
| 4 | 40 ppm NaH$_2$PO$_2$ | 91.43 | 91.27 | 91.22 | 0.16 | 0.15 | 0.15 | 1.8 | 1.7 | 1.7 |

TABLE 4-continued

| | | Properties after multiple processing (3 steps) | | | | | | | | |
|---|---|---|---|---|---|---|---|---|---|---|
| Ex. | | Transmission | | | Yellow Index | | | % Haze | | |
| No. | Stabilization | 1 | 2 | 3 | 1 | 2 | 3 | 1 | 2 | 3 |
| 5 | 100 ppm NaH$_2$PO$_2$ | 91.29 | 91.19 | 91.12 | −0.11 | −0.17 | −0.17 | 1.5 | 1.7 | 1.6 |
| 6 | 200 ppm NaH$_2$PO$_2$ | 91.08 | 90.97 | 91.17 | −0.16 | −0.48 | −0.25 | 1.5 | 1.7 | 1.7 |

This application is based on German Patent Application No. 195 44 563.5, filed on Nov. 30, 1995, the entire contents of which are incorporated herein by reference.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A method for the production of a highly transparent, impact resistant molding composition based on polymethyl methacrylate containing a disperse elastomeric phase, comprising a sequence of the following steps:

a) producing a latex emulsion DS in water with a core/shell structure by multi-step polymerization, wherein the core/shell structure comprises a hard, nonelastomeric polymer core with $T_g > 70°$ C., an intermediate elastomeric layer with $T_g < 25°$ C. comprising an acrylate polymer or copolymer, and at least one additional polymer layer with $T_g > 70°$ C. comprising a methacrylate polymer or copolymer;

b) coagulating the emulsion DS in a first extruder by heating, shearing, and adding 5–90 parts by weight of a matrix $M_1$ in the form of a melt, based on the solids content of the emulsion DS, to form a first melt mixture (DS+$M_1$) wherein $M_1$ is a fraction of a matrix M, and a matrix M comprises polymethyl methacrylate, wherein contained water is drawn off to leave a maximum of 10 wt % water in the first melt mixture, based on total solids;

c) compounding the first melt mixture (DS+$M_1$) in a second extruder by heating and shearing with the remaining quantity of the matrix $M_2$, such that $M_2$=M−$M_1$, wherein the quantity of matrix $M_2$ is more than 90 parts by weight, based on the solids content of the emulsion DS, and wherein contained water is substantially completely drawn off, to form a second melt mixture (DS+$M_1$+$M_2$);

d) extruding, cooling, and isolating the second melt mixture (DS+$M_1$+$M_2$) as a clear, impact-resistant, modified molding composition having low yellowing tendency, wherein only during step c) or thereafter, one or more reducing inorganic phosphorous compounds are added to the melt mixture, wherein the reducing inorganic phosphorus compounds are selected from the group consisting of phosphinic acid, phosphonic acid, and the alkali metal, alkaline-earth metal, aluminum, and ammonium salts of phosphinic acid and phosphonic acid, wherein the ammonium ion of the ammonium salts can be substituted with up to four $C_1$–$C_4$-alkyl and/or $C_5$–$C_8$ cycloalkyl groups.

2. The method of claim 1, wherein the reducing inorganic phosphorous compounds are added to the melt mixture at a point wherein the water content of the melt mixture is below 1 wt %, based on the solids content of the molding composition.

3. The method of claim 1, wherein the reducing inorganic phosphorous compounds are added in step c), together with the remaining quantity of the matrix polymer $M_2$.

4. The method of claim 1, wherein the reducing inorganic phosphorous compounds are added in step c) in the form of a masterbatch.

5. The method of claim 1, wherein the reducing inorganic phosphorous compounds are added to the granulated or ground molding composition after step d).

6. The method of claim 5, wherein the reducing inorganic phosphorous compounds are added as a masterbatch.

7. The method of claim 1, wherein the reducing inorganic phosphorous compounds are added as an aqueous solution.

8. The method of claim 1, wherein the reducing inorganic phosphorous compounds are added in solid form.

9. The method of claim 1, wherein the reducing inorganic phosphorous compound is sodium hypophosphite.

10. The method of claim 1, wherein the reducing inorganic phosphorous compound is added in a quantity of less than 50 ppm and at least 10 ppm, based on the emulsion DS.

11. A molded article, produced from a molding composition prepared by the method of claim 1.

12. The molded article of claim 11, wherein the reducing inorganic phosphorous compound is sodium hypophosphite.

13. The molded article of claim 11, wherein the reducing inorganic phosphorous compound is added in a quantity of less than 50 ppm and at least 10 ppm, based on the emulsion DS.

14. An impact-resistant molding composition containing a disperse elastomeric phase, wherein the molding composition comprises polymethyl methacrylate and has one of the following properties a–f:

a) the yellowness index remains substantially unchange after three melting cycles;

b) the haze value is below 15% after a hot water treatment for 5 min at 99° C.;

c) when the molding composition is produced with added blueing agents, the yellowness index is below 0.5;

d) when the molding composition is produced without added blueing agents, the yellowness index is below 1.5;

e) the yellowness index increases less than 0.3, based on the initial value, after 5,000 h weathering by the Xeno test;

f) the % haze increases less than 10%, based on the initial value, after 5,000 h weathering by the Xeno test.

15. The impact-resistant molding composition of claim 14, wherein the molding composition has a yellowness index below 1.0 when the molding composition is produced without added blueing agents.

16. The impact-resistant molding composition of claim 14, wherein the molding composition has a yellowness index below 0.3 when the molding composition contains no added blueing agents.

17. The impact-resistant molding composition of claim 14, wherein the molding composition has at least 3 of the properties a) through f).

18. The impact-resistant molding composition of claim 14, wherein the molding composition has at least 4 of the properties a) through f).

19. The impact-resistant molding composition of claim 14, wherein the molding composition has at least 5 of the properties a) through f).

20. The impact-resistant molding composition of claim 14, wherein the molding composition has all 6 of the properties a) through f).

* * * * *